United States Patent [19]
Rak et al.

[11] Patent Number: 4,606,943
[45] Date of Patent: Aug. 19, 1986

[54] METHOD FOR PREPARATION OF SEMIPERMEABLE COMPOSITE MEMBRANE

[75] Inventors: Stanley F. Rak, Mundelein; Kenneth Ward, Wheeling, both of Ill.

[73] Assignee: Culligan International Company, Northbrook, Ill.

[21] Appl. No.: 674,486

[22] Filed: Nov. 26, 1984

Related U.S. Application Data

[63] Continuation of Ser. No. 476,727, Mar. 18, 1983, abandoned.

[51] Int. Cl.$^4$ ............ B05D 3/10; B05D 5/00
[52] U.S. Cl. .............. 427/244; 210/500.28; 210/520.37; 264/41; 427/340; 427/342
[58] Field of Search ........... 427/244, 340, 246, 342; 210/500.2; 264/41

[56] References Cited

U.S. PATENT DOCUMENTS

| | | | |
|---|---|---|---|
| 3,179,632 | 2/1965 | Hendrix | 525/436 |
| 3,551,244 | 12/1970 | Forester et al. | 156/246 |
| 3,744,642 | 7/1973 | Scala et al. | 210/500.2 |
| 3,904,519 | 9/1975 | McKinney, Jr. et al. | 210/654 |
| 3,920,612 | 11/1975 | Stephens | 528/188 |
| 3,951,815 | 4/1976 | Wrasidlo | 210/500.2 |
| 3,996,318 | 12/1976 | Van Heuven | 264/5 |
| 4,005,012 | 1/1977 | Wrasidlo | 210/654 |
| 4,039,440 | 8/1977 | Cadotte | 210/654 |
| 4,048,144 | 9/1977 | Stephens | 528/179 |
| 4,113,628 | 9/1978 | Alegranti | 210/500.2 |
| 4,142,020 | 2/1979 | Okamura et al. | 428/403 |
| 4,242,208 | 12/1980 | Kawaguchi et al. | 210/500.2 |
| 4,259,183 | 3/1981 | Cadotte | 210/654 |
| 4,277,344 | 7/1981 | Cadotte | 210/654 |

FOREIGN PATENT DOCUMENTS

| | | |
|---|---|---|
| 0015149 | 9/1980 | European Pat. Off. |
| 0056175 | 7/1982 | European Pat. Off. |
| 2027614 | 2/1980 | United Kingdom |

OTHER PUBLICATIONS

Odian, G., "Principles of Polymerization", second edition, New York, John Wiley & Sons, 1981, pp. 152–154.

*Primary Examiner*—Evan K. Lawrence
*Attorney, Agent, or Firm*—George H. Gerstman

[57] ABSTRACT

An excellent reverse osmosis membrane having a high flux with superior chlorine resistance and low salt passage can be obtained by interfacially condensing a water soluble aromatic polyamide prepolymer with an essentially monomeric, aromatic, amine reactive polyfunctional acyl halide. The polyamide prepolymer may be prepared through the condensation reaction of an aromatic diamine and an aromatic anhydride acyl halide. Preferably the amide prepolymer, prepared from meta-phenylene diamine and trimelletic anhydride acid chloride, is reacted with trimesoylchloride to form the thin film membrane of the subject invention.

14 Claims, No Drawings

METHOD FOR PREPARATION OF SEMIPERMEABLE COMPOSITE MEMBRANE

This is a continuation of application Ser. No. 476,727, filed Mar. 18, 1983, abandoned.

The subject invention relates to a method for preparing a semipermeable membrane, particularly for use in reverse osmosis systems.

The removal of solutes from a solution by the separation of those solutes from the carrier solvent through a system utilizing a process known as reverse osmosis is well known in the art. Such a system typically has a semipermeable barrier membrane separating the solvent from the solution. The solution, usually aqueous, is introduced into one compartment of the system through a pump at pressures up to 1000 psig, the pressure being dependent chiefly on the species and concentration of the solutes. Both purified solvent and concentrated solution are continuously withdrawn from the system.

The effectiveness and efficiency of reverse osmosis apparatus depends principally on the performance of the membrane. In applications involving the desalination of seawater or brackish water sources, a reverse osmosis membrane must have high salt rejection characteristics, be capable of a high flux rate, and be resistant to deterioration by hydrolysis and by exposure to high pressure, temperature and dissolved chlorine.

An efficient reverse osmosis process generally requires a salt rejection capability of greater than 95%. Greater than 99.5% salt rejection characteristics is preferred. With such a capability, seawater of a typical 35,000 ppm salt content can, in a single pass through the system, be reduced to potable water of 175 ppm, a concentration much less than many untreated tap waters.

The flux rate or fluid flow rate through the membrane is important to the economics of the operation. High membrane flux rates permit the system to be built with less membrane and other associated equipment.

Chlorine and other oxidizing agents are often present in the solutions fed to a reverse osmosis system being utilized for fighting bacteria growth and the like. The presence of chlorine in the feed can greatly affect the life of the membrane through a mechanism of degradation that has been postulated as a reaction with primary amidic hydrogens. Such chemical degradation results in a relatively short useful life of the membrane, drastically reducing the ability of a membrane to reject salt over a relatively short period of time.

The first practical membranes utilized in reverse-osmosis procedures were formed of cellulose diacetate, being characterized by a very thin, dense surface layer adjacent to a much thicker supporting layer. Further development in this area introduced the ultrathin film secured to a separate thicker porous support. While initially prepared separately, the film or membrane can now be formed in situ on the support layer by a technique known as interfacial condensation. The history of this art as taught in the scientific literature and patents may be found in U.S. Pat. No. 4,277,344. In addition, the above-identified patent provides specific examples of this technique.

SUMMARY OF THE INVENTION

Therefore, an object of the subject invention is a method for preparing an improved semipermeable membrane for use in reverse osmosis systems.

Another object of the subject invention is a method for the preparation of a semipermeable membrane which has excellent salt-rejection characteristics, variably controlled flux rates, resistance to biological and hydrolytic degradation, reduced pH sensitivity, and improved resistance to deterioration in the presence of chlorine-containing feed water.

These and other objects are provided by the subject invention wherein an excellent reverse osmosis membrane can be obtained by condensing a water soluble aromatic polyamide prepolymer with an essentially monomeric, aromatic, amine reactive polyfunctional acyl halide. The prepolymer may be prepared through the condensation reaction of an aromatic diamine and an aromatic anhydride, preferably the reaction between metaphenylene diamine and trimellitic anhydride acid chloride. The reverse osmosis membrane prepared by the method of the invention comprises a microporous substrate, preferably of polysulfone supported by polyester non-woven fabric, and an ultrathin film or membrane having semi-permeable properties deposited or secured to one side of the microporous substrate. The procedure for preparing the above-described membrane includes the steps of (a) treating an appropriate microporous substrate with an aqueous solution of the previously prepared polyamide prepolymer; (b) contacting the prepolymer coated substrate with a solution of an polyacyl halide in a nonpolar solvent where an interfacial condensation reaction occurs; and (c) heat curing the composite membrane.

DETAILED DESCRIPTION OF THE INVENTION

As will be described in greater detail below, composite reverse osmosis membranes characterized by controlled flux, high rejection of solutes, and good resistance to attack by chlorine can be prepared by the interfacial polymerization reaction of a layer or film of an aqueous solution of the amine prepolymer having terminal primary amines on a porous support with, for example, a triacyl halide in a nonpolar solvent, particularly as exemplified by a solution of trimesoyl chloride, i.e., 1,3,5-benzenetricarboxylic acid chloride in heptane. The amine prepolymer which may be used to form the membrane of the subject invention may be prepared as set forth below.

In the conduct of this interfacial reaction, the acyl halide groups react with the primary amine groups of the prepolymer to produce amide linkages. Reaction is essentially instantaneous at the interface of polyacyl chlorides with amines. The three-pronged functionality of the triacyl halides is theorized to lead to the generation of a highly crosslinked, three-dimensional polymeric network in the membrane. The reverse osmosis membrane material is thus a polymer approaching a large molecular weight. While the prior art has recognized that diacyl halides do not necessarily improve the performance of the resulting membrane when used in conjunction with the triacyl halides, they may be of use in adjusting certain physical properties of the membrane such as specific ion rejection, permeate flux, and the like. 1 to 1 through 10 to 1 ratios of triacyl halides to diacyl halides appear most effective.

As a direct result of the high degree of crosslinking, the reverse osmosis membrane of the subject invention is generally insoluble in virtually any solvent that does not first seriously degrade its molecular structure. However, not all of the acyl halide functional groups become bound into amide linkages. A substantial proportion of the acyl halide functional groups are hydrolyzed by the water present in the amine reagent as solvent, generating carboxylic acid groups or carboxylate salts. These carboxyl groups have been discovered to exert surprising effects on the performance of the interfacial membrane, in that they affect flux and profoundly affect the membrane's rejection of aqueous dissolved solutes.

The amine prepolymer can be formed by the condensation reaction of an aromatic diamine and an aromatic anhydride. Examples of aromatic diamines suitable for use in the preparation of the amine prepolymer are:

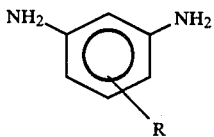

where R=H, CH₃, Halogen; and

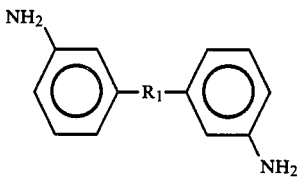

where R₁=—O—;

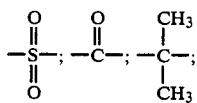

Examples of the aromatic anhydride which may be used to prepare the amine prepolymer are:

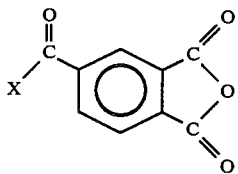

where X=halogen group. If X=chloride, the above compound is trimellitic anhydride acid chloride.

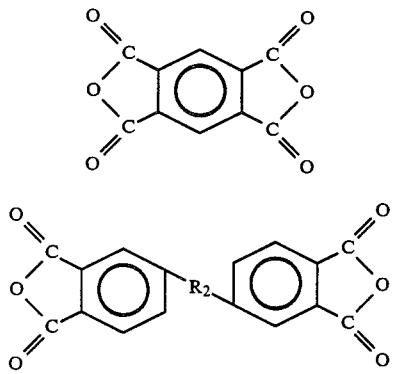

where R₂=

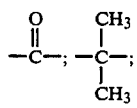

In addition, a polyacyl halide, such as trimesoyl chloride, or isophthaloyl chloride may be added to the reaction mixture of amine and anhydride to vary the properties of the resulting reverse osmosis membrane. The addition of such an acyl chloride when preparing the prepolymer would tend to add more crosslinking, which can affect the processibility of the membrane of the subject invention. Such addition of a strengthening crosslinking agent may also have the effect of reducing flux, though any noticeable consequence would depend greatly on the amount and identity of the acyl chloride added. As a result, generalizations concerning the effects of such additions cannot be reliably made.

In preparing the amine prepolymer, the aromatic diamine as set forth above is dissolved in a solution of methylene chloride (dichloromethane) and dimethyl formamide. The solution of the aromatic anhydride in dichloromethane is filtered to remove any hydrolyzed anhydride, and added to the amine solution with rapid stirring. The resulting solution is filtered, and the precipitate dried.

When meta-phenylenediamine and trimellitic anhydride acid chloride are the respective reactants, the prepolymer thus prepared has an average molecular weight in excess of approximately 400 and is primary amine terminated. The molecular formula of such an amine prepolymer can be represented as:

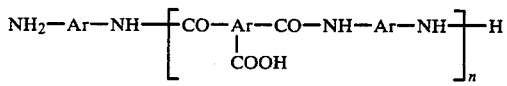

where Ar represents any carbocyclic monocyclic aromatic nucleus free of any acyl halide reactive group other than terminal amine groups and n represents a chain length from 1-10. It should be recognized that varying concentrations of prepolymers of different chain lengths, may be prepared dependent chiefly on the relative concentration of the reactants and crosslinking substituents.

After forming the amine prepolymer, the thin film composite membranes of the subject invention may be formed by a series of steps comprising (1) application of an aqueous amine prepolymer solution to the porous support; (2) reaction with the polyacyl halide, by contacting the prepolymer containing support with the polyacyl halide solution; and (3) curing by heating in an oven at approximately 110°-150° C., preferably 130° C.

The porous support may be any of the type conventionally used in reverse osmosis processes. The preferred supports, however, are those prepared from organic polymeric materials such as polysulfone, chlorinated polyvinyl chloride, polyvinyl butyral, polystyrene, cellulose esters, etc. Polysulfone film has been found to be a particularly effective support material for the membranes of the invention. Such polysulfone supports can be prepared by depositing a layer of polysulfone (Union Carbide P-3500) solution on a polyester unwoven fabric support material.

To the aqueous amine prepolymer may be added an agent for lowering its surface tension, i.e., increasing the wetting capability of the aqueous amine prepolymer solution. Detergents, such as the salts of alkyl hydrogen sulfates having a carbon chain length of $C_{12}$ to $C_{18}$ are particularly desirable. Specifically, sodium lauryl sulfate, n-$C_{11}H_{23}CH_2OSO^-Na^+$, exemplifies that which may be used.

The polyacyl halide of choice is trimesoyl chloride, primarily because of its ability to crosslink and form insoluble films. However, other polyacyl halides, such as that presented by the formula: $Ar(COX)_a$ wherein Ar is a mono- or polynuclear aromatic nucleus free of amine reactive substituents other than (COX); X is halogen; and $a \geq 2$. The polyacyl halide should be at least 0.01 weight-% soluble in liquid $C_1$–$C_{12}$ alkane or liquid halogenated lower alkane solvents. The 0.01 weight-percent represents the lower limit of solubility of the polyacyl halide in the nonpolar solvent which can be used in the interfacial polymerization reaction; concomitantly, ease of production on a commercial scale dictates a level of solubility of at least 1 weight-percent or more of the polyacyl halide in a suitable nonpolar solvent. Actually, most aromatic polyacyl halides are readily soluble in liquid aliphatic solvents such as the pentanes, hexanes, heptanes, octanes, etc. which are substantially inert toward the preferred porous support materials such as the polysulfones.

After formation of the ultrathin membrane by interfacial condensation reaction of the amine prepolymer and polyacyl halide, the composite is generally cured at 130° C. for 5 minutes. Other temperatures and times may be used to achieve the desired cure.

In the Examples which follow, all parts and percentages are by weight unless otherwise indicated.

EXAMPLE 1

To 500 ml of dichloromethane is added 25.0 g (0.24 moles) of metaphenylene diamine (MPD) and 13.2 g (0.16 moles) of dimethylformamide (DMF). To another 200 ml of dichloromethane, 16.0 g (0.08 moles) of trimellitic anhydride acid chloride (TMAAC) is added, and after this in solution, it is filtered to remove hydrolyzed TMAAC.

With rapid stirring of the MPD/DMF solution prepared above, slowly (15–20 ml/min) add the filtered TMAAC solution. This reaction is carried out at room temperature, but a slight increase in temperature will be observed, and should not boil the $CH_2Cl_2$ if slow addition of the TMAAC is observed.

After the addition is complete, immediately filter the reaction solution. Wash the precipitated prepolymer with 500 ml of $CH_2Cl_2$, and collect the precipitated again with suction. Dry the prepolymer at 30° C. under vacuum for 24 hours.

A polysulfone support film was prepared from a 15% solution of Union Carbide's P-3500 polysulfone in DMF. Sixteen grams of the amine prepolymer was dissolved in 0.5% NaOH solution with 0.1% sodium lauryl sulfate added to form a 2% amine prepolymer solution. The polysulfone support film was coated by immersion in the amine prepolymer solution. Excess amine prepolymer solution was removed by draining and the wet coated polysulfone film was immediately covered with a 0.5% heptane solution of trimesoylchloride (TMC). Contact time for the interfacial reaction was 10 seconds. The resulting composite membrane was further cured by heating at 130° C. for 5 minutes. The membrane was placed in a cell designed for characterizing RO membrane films and at 200 PSI. The membrane rejected 99.1% of the dissolved salt from a 2000 PPM sodium chloride solution, and at a flux of 5 gallons per square foot per day (GFD).

EXAMPLE 2

A composite membrane was made according to the procedure of Example 1, with the exception that no final curing step was employed. No rejection of salt was observed in the subsequent test under the conditions of Example 1.

EXAMPLE 3

The procedure of Example 1 was followed except the ratio of MPD to TMAAC was increased to 4 to 1 and cured at 112° C. for 5 minutes. The observed flux was 5.6 GFD with a salt rejection of 98.5%.

EXAMPLE 4

The procedure of Example 1 was followed except the ratio of MPD to TMAAC in the prepolymer was increased to 5 to 1 and the membrane was cured at 110° C. for 5 minutes. The observed flux was 5.6 GFD with a 98.8% salt rejection.

EXAMPLE 5

The procedure of Example 1 was followed, however, to the triacyl chloride was added sufficient diacyl chloride in the form of isophathoyl chloride to achieve a ratio of (a) 7.5 to 1 and (b) 4.2 to 1. The observed flux was (a) 3.7 GFD and (b) 10.1 GFD; the salt rejection for each was (a) 98.5% and (b) 85%.

EXAMPLE 6

The procedure of Example was followed, however in (c) the relative volumetric amount of DMF and $CH_2Cl_2$ was changed to a volumetric ratio of 1 DMF/10 $CH_2Cl_2$ in the prepolymer reaction medium as opposed to 0.22/10 in (a) and (b). In addition, 1 mole of Trimesoylchloride (TMC) was added in preparing the prepolymer for every 9 moles TMAAC in (c). The prepolymer treated porous support was immersed in a solution of 0.5% TMC in heptane to form the membranes for which the following values were observed:

|  | (a) | (b) | (c) |
|---|---|---|---|
| flux | 4 GFD | 8 GFD | 11.2 GFD |
| salt rejection | 96% | 98.5% | 98.6% |

While the invention has been described with reference to a preferred embodiment, it will be understood by those skilled in the art that various changes may be made and equivalents may be substitued for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. The method for the preparation of a semipermeable composite membrane which comprises:

reacting solutions of (1) a molar excess of an aromatic di-primary amine with (2) a mixture of a major amount of trimellitic anhydride acid halide and a minor amount of trimesoylchloride to form a water soluble prepolymer; placing an aqueous solution of said prepolymer on a porous support to form a prepolymer film; reacting said prepolymer film with (3) a nonpolar solvent solution containing trimesoylchloride; and drying the membrane formed thereby.

2. The method of claim 1 in which the aromatic di-primary amine is in solution in a mixture of dichloromethane and dimethyl formamide.

3. The method of claim 2 in which the ratio of dichloromethane to dimethylformamide is 10 to 1.

4. The method of claim 1 in which ingredient (2) is in solution in dichloromethane.

5. The method of claim 1 in which solution (3) contains heptane as the nonpolar solvent and trimesoyl chloride at 0.5 percent concentration.

6. The method of claim 1 in which said membrane is dried and cured by heating at 130° C. for 5 minutes.

7. The method of claim 1 in which ingredient (2) contains 9 molar parts of trimellitic anhydride acid chloride per one molar part of trimesoyl chloride.

8. The method of claim 1 in which said halide is chloride.

9. The method of claim 8 in which said solution containing trimesoylchloride also contains a diacyl chloride.

10. The method of claim 9 in which said diacyl chloride is isophthaloyl chloride.

11. The method for the preparation of a semipermeable, composite membrane which comprises:

reacting solutions of (1) a molar excess of metaphenylene diamine with (2) a mixture of about 9 molar parts of trimellitic anhydride acid chloride with about one molar part of trimesoylchloride to form a prepolymer;

placing an aqueous solution of said prepolymer on a porous support to form a prepolymer film;

reacting said prepolymer film with (3) a nonpolar solvent solution containing trimesoylchloride; and drying the membrane formed thereby.

12. The method of claim 11 in which solution (3) contains heptane as the nonpolar solvent and trimesoyl chloride at 0.5% concentration.

13. The method of claim 11 in which said solution containing trimesoylchloride also contains a diacyl chloride.

14. The method of claim 13 in which said diacyl chloride is isophthaloyl chloride.

* * * * *